United States Patent Office 2,783,257
Patented Feb. 26, 1957

---

2,783,257
PREPARATION OF A HIGHER ALIPHATIC KETONE

Joseph Donald Surmatis, Pompton Plains, and Joseph Weber, Paterson, N. J., assignors to Hoffmann-La Roche Inc., Nutley, N. J., a corporation of New Jersey No Drawing. Application March 3, 1954, Serial No. 413,962

6 Claims. (Cl. 260—410.9)

This invention relates to the synthesis of the known, useful compound hexahydropseudoionone, and to novel processes and intermediates useful in that synthesis.

A comprehensive embodiment of the invention is illustrated by a process which comprises condensing 1-halo-3,7-dimethyl-2-octene with an acetoacetic ester, subjecting the condensation product to ketonic hydrolysis, and reducing the resulting ketone. The following flow sheet illustrates such a process, and affords an overall survey of the invention; in the formulas, R represents a lower alkyl radical, preferably methyl or ethyl, and M represents an alkali metal, e. g. potassium.

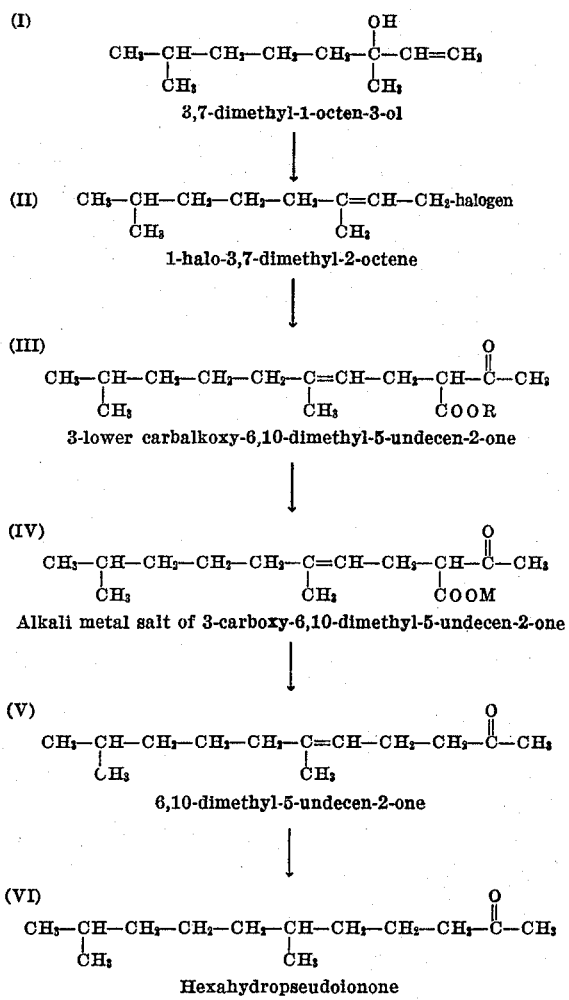

An additional aspect of the invention is represented by the novel compound herein designated 6,10-dimethyl-5-undecen-2-one, and by a process of preparing this compound which comprises condensing 1-halo-3,7-dimethyl-2-octene with an acetoacetic ester and subjecting the condensation product to ketonic hydrolysis.

Another aspect of the invention is represented by a process of preparing hexahydropseudoionone which comprises reducing the olefinic unsaturation of 6,10-dimethyl-5-undecen-2-one, e. g. by catalytic hydrogenation, and preferably by reaction of 6,10-dimethyl-5-undecen-2-one with elementary hydrogen in the presence of a palladium hydrogenation catalyst.

Still another aspect of the invention is illustrated by the novel compounds herein designated 3-lower carbalkoxy-6,10-dimethyl-5-undecen-2-one, and by the process of making said compounds which comprises condensing 1-halo-3,7-dimethyl-2-octene with an acetoacetic ester.

The invention is further disclosed in the following example, which is illustrative but not limitative thereof:

Example

To 280 g. of 3,7-dimethyl-1-octen-3-ol at room temperature was added while stirring 1560 cc. of concentrated aqueous hydrochloric acid (concentration about 37%). The mixture was stirred for one hour, the oil layer was separated and washed twice with water. The organic product thus obtained, comprising essentially cis-1-chloro-3,7-dimethyl-2-octene, had $n_D^{25}=1.4500$. It was used in the next step of the process without any further purification.

127 grams of sodium methylate and 310 grams of ethyl acetoacetate were stirred into 1800 cc. of benzene. Approximately 200 cc. of the solvent was distilled off at 100 mm. vacuum, and the reaction mixture was cooled to 20° C. The 1-chloro-3,7-dimethyl-2-octene referred to above was added from a separatory funnel over a one hour period. Then the temperature was increased to 60° C. and kept there while stirring for 12 hours. The mixture was cooled to room temperature and washed twice with water. The solvent was removed in vacuo leaving a residue comprising essentially 3-carbethoxy-6,10-dimethyl-5-undecen-2-one.

This residue was dissolved in 1600 cc. of ethyl alcohol. To the solution was added a solution of 260 g. of potassium hydroxide in 500 cc. of water. The mixture was stirred for 4 hours at 40–45° C. The reaction mixture was then acidified by dropping in 400 cc. of concentrated aqueous (37%) hydrochloric acid in one hour. A vigorous evolution of carbon dioxide took place during the acidification. After stirring for two hours at 60° C. to complete the decarboxylation, the mixture was cooled and diluted with 1.5 liters of water. The oil layer which separated was removed, and the aqueous acid layer was extracted three times, each time with 200 cc. of benzene. The combined oil product and benzene extracts were water washed until neutral. On fractionation, the product, which comprised essentially 6,10-dimethyl-5-undecen-2-one, boiled at 65–66° C./0.3 mm., $n_D^{25}=1.446$.

200 grams of 6,10-dimethyl-5-undecen-2-one was hydrogenated, using freshly prepared 5% palladium-on-charcoal catalyst at 500 lbs. per square inch hydrogen pressure. In one hour the temperature rose from 25 to 60° C. and the hydrogenation was completed. On fractionation, hexahydropseudoionone was obtained in a fraction distilling at 68–69° C./0.5 mm., $n_D^{25}=1.433$.

We claim:

1. A process of making hexahydropseudoionone which comprises condensing 1-halo-3,7-dimethyl-2-octene with an acetoacetic ester, subjecting the condensation product to ketonic hydrolysis, and reducing the resulting ketone.

2. A process of making hexahydropseudoionone which comprises reducing 6,10-dimethyl-5-undecen-2-one.

3. 3-lower carbalkoxy-6,10-dimethyl-5-undecen-2-one.
4. 3-carbethoxy-6,10-dimethyl-5-undecen-2-one.
5. An alkali metal salt of 3-carboxy-6,10-dimethyl-5-undecen-2-one.
6. 6,10-dimethyl-5-undecen-2-one.

References Cited in the file of this patent
UNITED STATES PATENTS 2,272,122  Lee _____ Feb. 3, 1942